United States Patent
Schneider et al.

(10) Patent No.: US 9,822,806 B2
(45) Date of Patent: Nov. 21, 2017

(54) HYDRAULIC SYSTEM

(75) Inventors: Klaus Schneider, Hergatz (DE); Wilhelm Kraeutler, Koblach (AT)

(73) Assignee: Liebherr-Werk Nenzig GmbH, Nenzing (AT)

(*) Notice: Subject to any disclaimer, the term of this patent is extended or adjusted under 35 U.S.C. 154(b) by 1342 days.

(21) Appl. No.: 12/820,315

(22) Filed: Jun. 22, 2010

(65) Prior Publication Data

US 2010/0319335 A1 Dec. 23, 2010

(30) Foreign Application Priority Data

Jun. 22, 2009 (DE) .................. 10 2009 029 840

(51) Int. Cl.
*F16H 61/4139* (2010.01)
*F15B 21/00* (2006.01)

(52) U.S. Cl.
CPC ...... *F15B 21/00* (2013.01); *F15B 2211/20561* (2013.01); *F15B 2211/613* (2013.01); *F15B 2211/7058* (2013.01); *F16H 61/4139* (2013.01)

(58) Field of Classification Search
CPC .................. F16H 61/4139; F15B 2211/613
USPC ................................... 60/419, 488
See application file for complete search history.

(56) References Cited

U.S. PATENT DOCUMENTS

| | | | | |
|---|---|---|---|---|
| 2,983,101 A | * | 5/1961 | Ransom | F16H 61/46 417/251 |
| 4,026,107 A | * | 5/1977 | Kosek et al. | 60/419 |
| 4,553,391 A | * | 11/1985 | Reinhardt | 60/419 |
| 5,878,569 A | * | 3/1999 | Satzler | 60/419 |
| 6,122,913 A | * | 9/2000 | Macit | 60/419 |
| 6,378,301 B2 | * | 4/2002 | Endo et al. | 60/419 |
| 6,973,782 B2 | * | 12/2005 | Rose | 60/419 |
| 2007/0204608 A1 | | 9/2007 | Von Baumen et al. | |
| 2009/0100830 A1 | | 4/2009 | Schneider et al. | |

FOREIGN PATENT DOCUMENTS

| | | |
|---|---|---|
| DE | 3017819 | 11/1980 |
| DE | 102005008217 | 8/2006 |
| DE | 112004002502 | 10/2006 |
| DE | 102007046696 | 4/2009 |
| JP | S51-073677 | 6/1976 |
| JP | S59-110904 | 6/1984 |
| JP | H10-299705 | 11/1998 |
| JP | 2004-116656 | 4/2004 |
| JP | 2007-528471 | 10/2007 |

OTHER PUBLICATIONS

European Patent Office Action dated May 14, 2014.
English Translation of the Japanese Office Action dated Feb. 12, 2014.

* cited by examiner

*Primary Examiner* — F. Daniel Lopez
(74) *Attorney, Agent, or Firm* — Dilworth & Barrese, LLP

(57) ABSTRACT

The present invention relates to a hydraulic system with a feed pump for feeding hydraulic fluid, wherein the feed pump is driven by a hydraulic drive motor. The invention furthermore comprises a method for feeding hydraulic fluid into a hydraulic system via a feed pump, wherein the feed pump is driven by a hydraulic drive motor.

10 Claims, 3 Drawing Sheets

HYDRAULIC SYSTEM

BACKGROUND OF THE INVENTION

The present invention relates to a hydraulic system with a feed pump for feeding hydraulic fluid.

Feed pumps usually are employed to supply the suction side of a further hydraulic pump with hydraulic fluid. In this way, cavitations in the hydraulic circuit can be avoided in the case of fast changes in pressure. Feed pumps usually are operated with a relatively low delivery pressure.

A typical hydraulic system with a feed pump according to the prior art is shown in FIG. 5. The hydraulic system comprises a closed hydraulic circuit of a variable displacement pump 1 and a variable displacement motor 2, wherein the variable displacement pump 1 is driven by an internal combustion engine and the variable displacement motor 2 drives a winch 4. The feed pump 5 is connected with both sides of the closed hydraulic circuit via check valves 6, in order to avoid cavitations as a result of pressure drops due to dynamic processes such as the swivelling of the pump, and to redeliver hydraulic fluid in the case of external leakages in the hydraulic circuit. Via a transmission 7, the feed pump 5 likewise is driven by the internal combustion engine 3.

Feed pumps are also used to redeliver the differential amount between the volume on the piston and ring surfaces of the hydraulic cylinder in half-open circuits and to supply the storage pumps in accumulator applications with hydraulic fluid with a certain minimum pressure.

Known hydraulic systems with feed pump often have a relatively poor efficiency of the feed pump 5 due to the high mechanical tugging power of the feed pump 5. With a large feed rate, a large number of pumps or pumps with a large absorption volume are required, which requires a correspondingly large installation space at the transfer gear of the internal combustion engine. Possibly, an additional transfer gear or corresponding drives for the pumps are also necessary.

SUMMARY OF THE INVENTION

It is the object of the present invention to provide a hydraulic system with feed pump which is improved as compared to the prior art.

In accordance with the invention, this object is solved by a hydraulic system according to the description herein. The hydraulic system comprises a feed pump for feeding hydraulic fluid, wherein the feed pump is driven by a hydraulic drive motor in accordance with the invention. In contrast to the prior art, the feed pump therefore is not driven directly via an internal combustion engine, but via a hydraulic drive motor.

By using a hydraulic drive motor for driving the feed pump, an increased flexibility is obtained in the configuration of the hydraulic system. In particular, it can be possible to improve the efficiency by a reduction of the tugging power. In addition, a more flexible arrangement of the hydraulic system becomes possible, due to which e.g. the required installation space at the transfer gear or the number of drives at the transfer gear can be reduced.

The feed pump of the invention can be employed in all those applications in which feed pumps in accordance with the prior art are also used. The feed pump of the invention usually supplies the suction side of a further hydraulic pump with hydraulic fluid. In particular, the feed pump can be employed for redelivering hydraulic fluid in a closed and in a half-open hydraulic circuit, for feeding hydraulic fluid at the suction port of a hydraulic pump of an open circuit, and generally for delivering large amounts of oil at low pressure, e.g. for feeding hydraulic fluid at the suction port of a storage pump for charging a hydraulic accumulator.

Advantageously, the system of hydraulic drive motor and feed pump is configured such that the hydraulic drive motor can be operated with a greater pressure and a correspondingly smaller delivery rate than the feed pump. In particular, the hydraulic drive motor therefore advantageously has a smaller maximum absorption volume than the feed pump. In accordance with the invention, the hydraulic drive motor thus can be operated with high pressure and low delivery rate, whereas the feed pump provides a lower pressure and a correspondingly higher delivery rate. This is advantageous because feed pumps only must provide a relatively low delivery pressure, whereas in part considerable delivery rates are required. The arrangement in accordance with the invention now provides for using a drive motor with relatively small absorption volume and hence relatively low tugging power and for nevertheless achieving high delivery rates.

Advantageously, the pressure ratio between the input of the hydraulic drive motor and the output of the feed pump is greater than 3:1, furthermore advantageously greater than 5:1, furthermore advantageously greater than 10:1 and furthermore advantageously greater than 30:1. These pressure ratios allow different applications of the feed pump. If the feed pump should be used e.g. for supplying closed or half-open hydraulic circuits, a relatively high feed pressure (for example between 30 and 50 bar) is required. If the hydraulic drive motor is operated with a pressure of 150 bar, the pressure ratio of 3:1 provides for an operation of the feed pump at 50 bar. At correspondingly higher operating pressures of the hydraulic drive motor of e.g. 250 bar, a pressure ratio of about 5:1 then is obtained. However, if the feed pump is used in applications in which a lower feed pressure of e.g. 5 bar is required, correspondingly higher pressure ratios are possible. Such a pressure is required for example when the feed pump supplies the pump of an open hydraulic circuit with hydraulic fluid.

The reduction of the operating pressure and the resulting increase in the delivery rate provides for using smaller drive motors with a lower delivery rate and thus for a reduction of the tugging power in operating phases in which the feed pump must provide only little hydraulic fluid. Not in all operating points is the efficiency better than in the case of a direct drive via an internal combustion engine, but the operating points with a better efficiency usually occur more frequently.

Advantageously, the hydraulic drive motor therefore has a smaller maximum absorption volume than the feed pump, wherein advantageously the maximum absorption volumes have a ratio of less than 1:3, furthermore advantageously of less than 1:5, furthermore advantageously of less than 1:10, and furthermore advantageously of less than 1:30. This provides for gear ratios which have already been described above.

Furthermore advantageously, the output and input axles of the hydraulic drive motor and of the feed pump are connected with each other without the interposition of a mechanical transmission. The pressure ratio thus is determined by the corresponding ratios of the absorption volumes alone.

Advantageously, the feed pump is configured as a fixed displacement pump. As a result, costs and installation space can be saved. Alternatively or in addition, the hydraulic drive motor can also be configured as a fixed displacement motor. As a result, costs and installation space likewise can be saved.

Furthermore advantageously, the hydraulic drive motor is configured as a fixed displacement motor and the feed pump is configured as a fixed displacement pump. The hydraulic drive motor and the feed pump advantageously have the corresponding ratios of their absorption volumes as indicated above. This arrangement can be realized in a particularly inexpensive way.

Alternatively, however, it can also be provided that the hydraulic drive motor is configured as a variable displacement motor and the feed pump is configured as a fixed displacement pump. This is more expensive, but has certain energetic advantages in operation, since the absorption volume of the hydraulic drive motor can be adapted to the operating situation. The maximum absorption volume of the hydraulic drive motor and the constant absorption volume of the feed pump advantageously have the ratios as indicated above. Alternatively, the ratios indicated above can also be achieved by a corresponding adjustment of the hydraulic drive motor in operation.

The hydraulic system in accordance with the invention advantageously comprises a second hydraulic pump, by which the hydraulic drive motor can be driven. Different drive variants for driving the hydraulic drive motor are possible, wherein the second hydraulic pump each can be operated with a relatively high pressure and only must provide a relatively small delivery rate.

In a first variant of the present invention, the second hydraulic pump can be that hydraulic pump which is supplied with hydraulic fluid by the feed pump. As a result, a separate drive for the hydraulic drive motor can be omitted. Advantageously, the inlet of the hydraulic drive motor is connected or connectable with the outlet of the second hydraulic pump, whereas the inlet of the second hydraulic pump is connected or connectable with the outlet of the feed pump. This can be advantageous in particular in accumulator applications, in which large delivery rates are required.

On the other hand, a separate second hydraulic pump can be provided for driving the hydraulic drive motor. The second hydraulic pump and the hydraulic drive motor thus form a hydraulic transmission. In particular, the separate second hydraulic pump alone can serve for driving the hydraulic drive motor. In accordance with the invention, a second hydraulic pump with a smaller absorption volume can be used, whereby the tugging power of the second hydraulic pump is reduced. Advantageously, the second hydraulic pump has a smaller maximum absorption volume than the feed pump. Furthermore advantageously, the maximum absorption volumes of the second hydraulic pump and of the feed pump have a ratio of less than 1:3, furthermore advantageously of less than 1:5, furthermore advantageously of less than 1:10, and furthermore advantageously of less than 1:30.

Due to the smaller absorption volume of the second hydraulic pump, the tugging power thereof in phases in which the feed pump must deliver less hydraulic fluid or none at all correspondingly is smaller than in a greater hydraulic pump, which would directly be used for feeding hydraulic fluid into the hydraulic system. A better efficiency hence is not achieved in all operating points. In terms of time, however, the operating points with a better efficiency prevail, so that the average total efficiency can be improved.

In accordance with the invention, the second hydraulic pump can be driven by an internal combustion engine or an electric motor. The internal combustion engine or electric motor advantageously serves to drive one or more further hydraulic pumps. In particular, a transfer gear can be provided, via which the internal combustion engine or electric motor drives the second hydraulic pump as well as one or more further hydraulic pumps. Due to the smaller absorption volume of the second hydraulic pump the installation space required at the transfer gear correspondingly is smaller.

Advantageously, the second hydraulic pump is configured as a variable displacement pump. Furthermore advantageously the second hydraulic pump is pressure-controlled. This is advantageous in particular with a separate second hydraulic pump. Due to the pressure control, the correspondingly lower delivery pressure of the feed pump is adjusted with the operating pressure for the hydraulic drive motor. In particular, this can be a pressure control which keeps the operating pressure of the hydraulic drive motor at a specified constant value. However, an adjustable operating pressure for the hydraulic drive motor is also conceivable.

In a further embodiment, the hydraulic system of the invention comprises a high-pressure accumulator which is connected or connectable with the hydraulic drive motor. Thus, the high-pressure accumulator provides hydraulic fluid for the hydraulic drive motor with a correspondingly high operating pressure. The hydraulic drive motor can be drivable via the high-pressure accumulator. Furthermore, it can be provided that the hydraulic drive motor is connected or connectable both with the high-pressure accumulator and with a second hydraulic pump. In particular, a high-pressure accumulator can be provided in the pressure-controlled system of second hydraulic pump and hydraulic drive motor.

The feed pump of the invention can be employed for all those applications for which feed pumps in accordance with the prior art are also used.

In particular, the feed pump can feed hydraulic fluid into one or more hydraulic circuits comprising hydraulic pump and hydraulic motor. With a closed circuit, hydraulic feeding via the feed pump ensures that cavitations as a result of pressure drops due to dynamic processes, such as the swivelling of the pump, can be prevented and oil which gets lost due to leakages of the hydraulic system is redelivered. In a half-open circuit comprising pump and hydraulic cylinder, the feed pump also ensures the redelivery of the differential amount between the volume on piston and ring surfaces. Advantageously, the feed pump is connected with both sides of the closed or half-open hydraulic circuit via check valves. Furthermore, the feed pump can be used in an open hydraulic circuit comprising pump and motor, in order to feed in oil at the suction port of the pump with a possibly speed-dependent minimum pressure, for example with at least 5 bar.

Furthermore, there can also be provided a hydraulic system with a third hydraulic displacement machine, via which a high-pressure accumulator can be charged, wherein the feed pump supplies the third hydraulic displacement machine with hydraulic fluid. The delivery volume of the third hydraulic displacement machine can be increased thereby, since the same operates as a self-priming pump together with the feed pump.

Advantageously, the third hydraulic displacement machine is mechanically connected or connectable with a hydraulically driven apparatus, whose energy can be recovered by charging the hydraulic accumulator. For example, the apparatus can be the hoisting winch of a crane, so that the potential energy released upon lowering the load can be converted into hydraulic energy via the third hydraulic displacement machine and can be stored in the hydraulic accumulator. The apparatus likewise can be a luffing winch, a slewing gear or a traveling drive of a working machine, in particular of a crane. The use of the hydraulic feed pump for sucking in the hydraulic fluid increases the delivery volume of the third hydraulic displacement machine. In particular, the same can be operated with higher rotational speeds. Without feeding, however, cavitation would occur at the sliding surfaces. As a result, major parts might be washed out and lead to the clogging of the lubrication bores in the pistons. This in turn leads to a lack of lubricant on the sliding surface, so that without feed pump a failure of the complete hydraulic displacement machine might occur. The drive of the feed pump in accordance with the present invention via a hydraulic drive motor provides for reducing the tugging power when driving the feed pump, in particular in those operating phases in which the third hydraulic displacement machine is actuated less or not at all.

The third hydraulic displacement machine can also be used to drive the apparatus by means of the hydraulic fluid stored in the high-pressure accumulator, so that in phases of high load the stored energy can be used for driving the apparatus or for supporting a primary drive.

Driving the hydraulic drive motor of the feed pump can be effected via a separate hydraulic pump, which is driven by an internal combustion engine or an electric motor.

In a further variant of the present invention, the inlet of the hydraulic drive motor of the feed pump is, however, connected or connectable with the outlet of the third displacement machine, and the inlet of the third displacement machine is connected or connectable with the outlet of the feed pump. In particular, the corresponding components can permanently be connected with each other, in particular without valves being provided in the connecting lines. The hydraulic fluid delivered by the third displacement machine under high pressure thus can be used to drive the hydraulic drive motor and hence the feed pump, which in turn provides hydraulic fluid with a lower pressure to the third hydraulic displacement machine. The third hydraulic displacement machine thus can form the second hydraulic pump, which drives the hydraulic drive motor. Advantageously, the inlet of the hydraulic drive motor furthermore is connected with a high-pressure accumulator. If no external forces act on the third hydraulic displacement machine, the individual pressures are in equilibrium with each other, wherein the inlet pressure at the drive motor and the outlet pressure at the feed pump are determined by the ratio of the absorption volumes of the hydraulic drive motor and of the feed pump. This arrangement has the advantage that no tugging power occurs when the third hydraulic displacement machine is in a rest position, i.e. when the apparatus is not moved. Accordingly, no energy losses occur in these phases, so that the total efficiency is improved correspondingly.

Advantageously, the high-pressure accumulator can be connected with a further hydraulic displacement machine via a valve, wherein the high-pressure accumulator can be charged by the further hydraulic displacement machine. This arrangement takes into account that the high-pressure accumulator cannot be charged via the third hydraulic displacement machine alone, since for operation of the feed pump a certain pressure already is required in the high-pressure accumulator. Therefore, the further hydraulic displacement machine can be used for initially charging the high-pressure accumulator.

The hydraulic system of the invention furthermore advantageously comprises a hydraulic circuit including a hydraulic pump and a hydraulic motor, wherein the hydraulic motor drives an apparatus, and wherein the third hydraulic displacement machine is mechanically connected or connectable with the apparatus. The hydraulic circuit comprising hydraulic pump and hydraulic motor thus forms the primary drive of the apparatus, so that the third hydraulic displacement machine can be used for charging the high-pressure accumulator and for drive support of the first hydraulic circuit. Advantageously, the hydraulic pump of the hydraulic circuit is driven by an internal combustion engine or an electric motor.

Furthermore advantageously, at least one internal combustion engine is provided in the hydraulic system of the invention, which drives the pump of a first hydraulic circuit comprising pump and motor. An inventive system of hydraulic drive motor and feed pump is provided, in order to provide hydraulic fluid to the first hydraulic circuit. The internal combustion engine or the electric motor can drive a second hydraulic pump, which drives the hydraulic drive motor of the feed pump. Such arrangement furthermore can include a second inventive system of hydraulic drive motor and feed pump. In particular this further system advantageously serves to supply hydraulic fluid to a third hydraulic displacement machine, via which a high-pressure accumulator can be charged.

The present invention furthermore comprises a method for feeding hydraulic fluid into a hydraulic system via a feed pump. In accordance with the invention it is provided that the feed pump is driven by a hydraulic drive motor. Quite obviously, the method of the invention provides the same advantages as already explained above with respect to the hydraulic system. In accordance with the invention, the feed pump is used e.g. to feed hydraulic fluid into a closed or a half-open hydraulic circuit, or to provide hydraulic fluid on the suction side of a hydraulic pump. In particular, the pump can be the pump of an open hydraulic circuit comprising pump and motor, or a storage pump for a hydraulic accumulator.

Advantageously, the hydraulic drive motor is operated with a greater pressure and a correspondingly smaller delivery rate than the feed pump. As already set forth above, a high operating pressure at the hydraulic drive motor thus can be converted into a lower delivery pressure of the feed pump in accordance with the invention, wherein a corresponding increase of the delivery rate is achieved. Advantageously, the pressure ratio is greater than 3:1, furthermore advantageously greater than 5:1, furthermore advantageously greater than 10:1 and furthermore advantageously greater than 30:1. As already described above with respect to the hydraulic system, different applications for the feed pump thus are obtained. The ratio is determined by the operating pressure for the hydraulic drive motor and the delivery pressure to be supplied by the feed pump. The higher the operating pressure of the hydraulic drive motor, the smaller the required delivery rate and hence the hydraulic tugging power, in particular when the hydraulic drive motor in turn is driven via a hydraulic pump.

Advantageously, the feed pump is operated with a delivery pressure below 70 bar, in particular with a pressure between 0.1 and 50 bar. A typical pressure for feeding hydraulic fluid is e.g. 5 bar for feeding on the suction side of a hydraulic pump supplied with hydraulic fluid by the feed pump. For supplying a closed or half-open hydraulic circuit, on the other hand, typical pressures lie in a range of 35 bar. The hydraulic drive motor in turn advantageously is operated with operating pressures of more than 150 bar, wherein a typical operating pressure can be about 250 bar.

Advantageously, the method in accordance with the invention is performed as described already with respect to the hydraulic system. In particular, the method of the invention is a method for operating a hydraulic system as described above.

BRIEF DESCRIPTION OF THE DRAWINGS

The present invention will now be explained in detail with reference to embodiments and drawings, in which.

DESCRIPTION OF THE PREFERRED EMBODIMENTS

Figure 5:
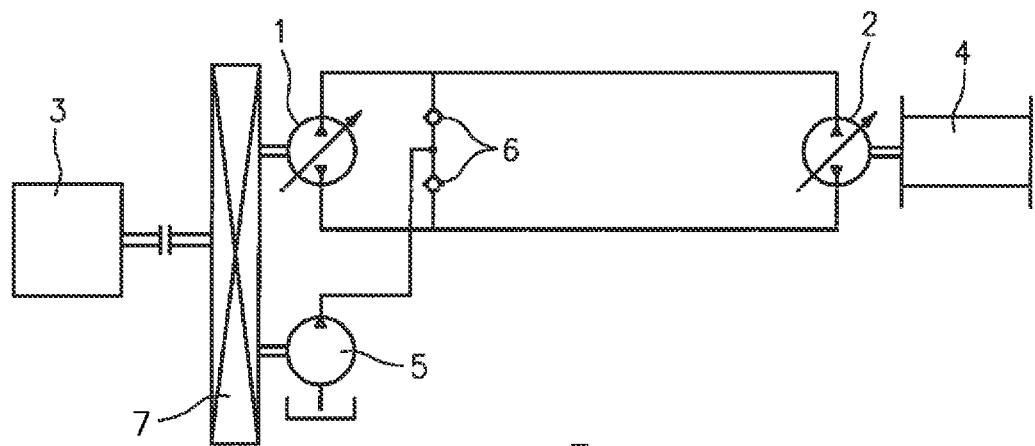
FIG. 5 shows a hydraulic system in accordance with the prior art.
Figure 1:
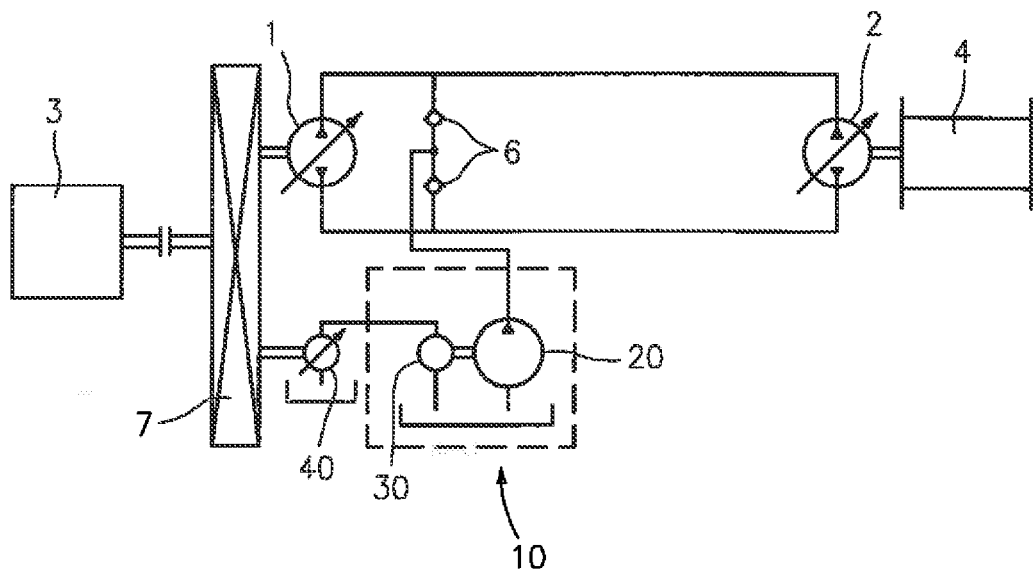
FIG. 1: shows a first embodiment of the present invention, in which the feed pump for feeding hydraulic fluid is incorporated in a closed hydraulic circuit.

FIG. 1 shows a first embodiment of a hydraulic system in accordance with the invention. There is provided a first hydraulic circuit comprising a hydraulic pump 1 and a hydraulic motor 2. The hydraulic pump 1 is driven by an internal combustion engine 3. For this purpose, the hydraulic pump 1 is mechanically connected with the internal combustion engine 3 via a transmission 7 and possibly via a clutch. As an alternative to the internal combustion engine, an electric motor might also be used. The hydraulic pump 1 is hydraulically connected with the hydraulic motor 2 and drives the same. The hydraulic motor 2 in turn drives an apparatus 4, in this case a winch. The winch in particular can be the hoisting winch of a crane. Alternatively, the apparatus can also be a luffing winch, a slewing gear or a traveling drive. The hydraulic system can be used e.g. in a traveling working machine, in particular in a crane. In the embodiment, the first hydraulic circuit is configured as a closed hydraulic circuit between the hydraulic pump 1 and the hydraulic motor 2. The hydraulic motor 2 is configured as a rotary machine and includes an output axle which is driven by conversion of the hydraulic energy into mechanical energy in the hydraulic motor 2. In the embodiment, both the hydraulic pump 1 and the hydraulic motor 2 each are configured adjustable as a variable displacement pump and variable displacement motor, respectively.

In accordance with the invention a feed pump 20 is provided, which is driven by a hydraulic drive motor 30. Via check valves 6, the feed pump 20 is connected with both halves of the first hydraulic circuit. Feeding is effected to avoid cavitation in the first hydraulic circuit and to redeliver hydraulic fluid, which escapes from the hydraulic circuit due to external leakages.

In the embodiment, the hydraulic drive motor 30 is configured as a fixed displacement motor. The feed pump 20 likewise is configured as a fixed displacement pump. The hydraulic drive motor 30 has a smaller absorption volume than the feed pump 20. In particular, a ratio of the absorption volumes of hydraulic drive motor and feed pump of about 1:7 is provided. The feed pump 20 hence supplies the first hydraulic circuit with hydraulic fluid of e.g. 35 bar, whereas the hydraulic drive motor 30 can be operated with an operating pressure of about 250 bar. For the system of hydraulic drive motor 30 and feed pump 20 other ratios of the absorption volumes are of course also possible, which depend on the optimum operating pressure for the hydraulic drive motor 30 and the delivery pressure required by the feed pump 20. In the embodiment, the feed pump 20 is driven by the hydraulic drive motor 30 without interposition of a mechanical transmission, so that a compact and low-loss unit is obtained.

The hydraulic drive motor 30 in turn is driven by a second hydraulic pump 40. The hydraulic pump 40 likewise is driven by the internal combustion engine 3, for which purpose the same is connected therewith via the transmission 7. By using the hydraulic drive motor 30 with small absorption volume, the second hydraulic pump 40 can also be dimensioned correspondingly small. The hydraulic pump 40 advantageously has a maximum absorption volume which is smaller than the absorption volume of the feed pump 20. In particular, the second hydraulic pump 40 has a maximum absorption volume which approximately has the relation to the absorption volume of the feed pump 20 as it would be indicated with respect to the absorption volumes of the hydraulic drive motor 30 and the feed pump 20. The hydraulic pump 40 is a variable displacement pump. The hydraulic pump 40 is actuated via a pressure control.

The arrangement of the invention has the advantage that in operating phases in which only little or no hydraulic oil at all is feed in via the feed pump 20 the tugging power of the second hydraulic pump 40 dimensioned small correspondingly is lower than in a greater hydraulic pump. As compared to standard feeding via a feed pump driven directly via the internal combustion engine, the efficiency hence is not better in all operating points, but the operating points with the better efficiency distinctly prevail in terms of time. This results in an improved total efficiency of the arrangement. In addition, the present invention has the advantage that the installation space required at the transfer gear can be reduced considerably, as here only a smaller pump is required. Possibly, less drives are necessary at the transfer gear, as a plurality of hydraulic circuits can also be supplied via the larger delivery rate of the feed system of the invention.

Figure 2:
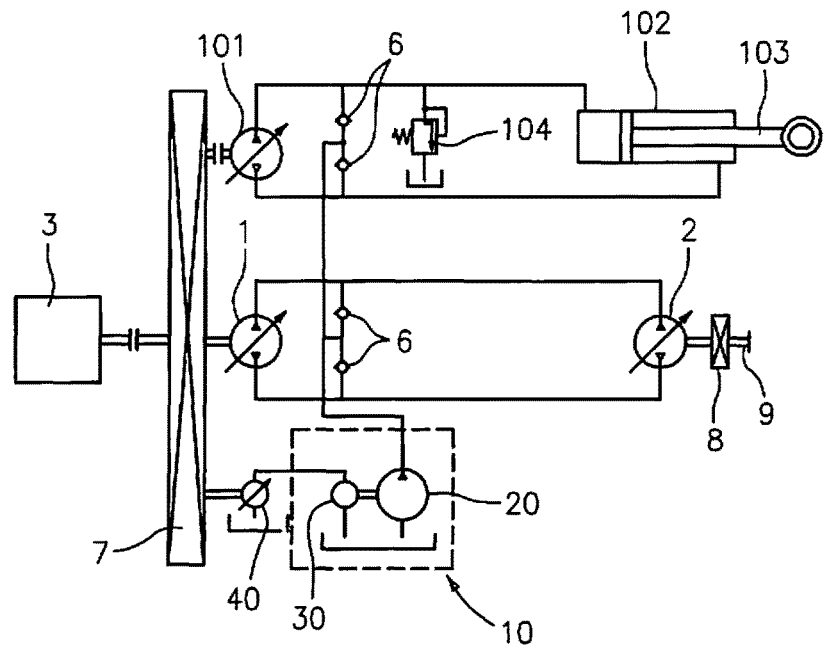
FIG. 2: shows a second embodiment of the present invention, wherein the feed pump for feeding hydraulic fluid is incorporated in a closed hydraulic circuit and in a half-open hydraulic circuit.

Such arrangement is shown in FIG. 2. The arrangement shown in FIG. 1, which comprises a first hydraulic circuit with hydraulic pump 1 and hydraulic motor 2 and the feed system of the invention, is expanded by a second hydraulic circuit. The second hydraulic circuit includes a second hydraulic pump 101 and a second hydraulic motor 102. The second hydraulic motor 102 is a hydraulic cylinder whose two cylinder chambers each are connected with the inputs and outputs of the hydraulic pump 101. Accordingly, this is a half-open hydraulic circuit, since the differential amount between the volumes on the piston and ring surfaces of the hydraulic cylinder 102 must be redelivered via the feed pump upon movement of the hydraulic piston 103. The feed pump 20 of the feed system in accordance with the invention in turn is connected with both arms of the half-open hydraulic circuit via check valves 6. Furthermore, a valve 104 is provided on the piston side, through which hydraulic fluid can flow off.

In accordance with the invention, the feed pump 20 hence can be used for the supply of several hydraulic circuits. The hydraulic circuit shown in FIG. 2 can be used for example in a crane, wherein the hydraulic cylinder 102 is used e.g. as luffing cylinder of a boom and the hydraulic motor 2 is used for driving a winch. As likewise indicated in FIG. 2, driving the winch can also be effected via a mechanical transmission 8 and a clutch 9.

Figure 3:
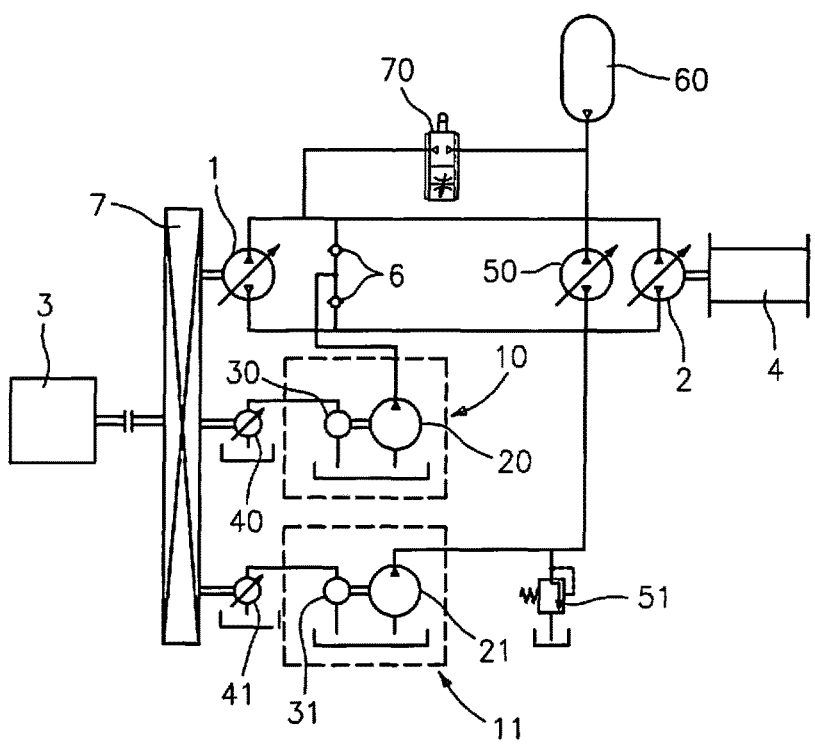
FIG. 3: shows a third embodiment of the present invention, wherein a first feed pump of the invention for feeding hydraulic fluid is incorporated in a closed hydraulic circuit, whereas a second feed pump in accordance with the invention is used for supplying hydraulic fluid to a storage pump.
Figure 4:
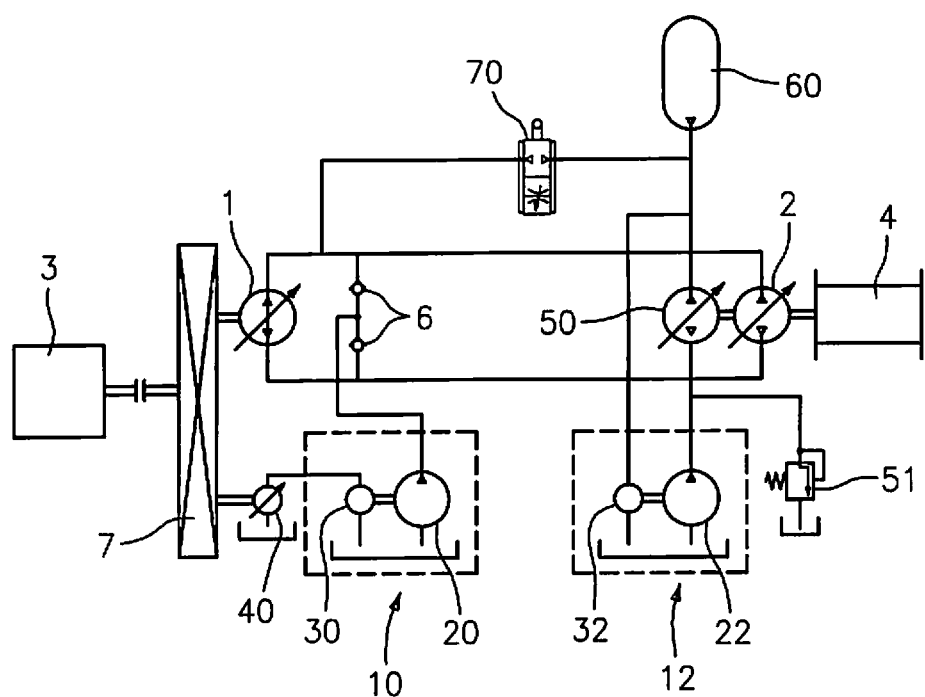
FIG. 4: shows a fourth embodiment of the present invention, wherein a first feed pump in accordance with the present invention again feeds hydraulic fluid into a closed hydraulic circuit and a second feed pump in accordance with the present invention supplies a storage pump with hydraulic fluid, wherein the hydraulic drive motor of the second feed pump is driven via the storage pump.

In FIGS. 3 and 4 two further embodiments of the present invention are shown, in each of which a third displacement machine 50 is provided, by which a hydraulic high-pressure accumulator 60 can be charged. The inventive arrangement of feed pump and hydraulic drive motor now is used in the embodiments of FIGS. 3 and 4 to supply the suction side of the third displacement machine 50 operating as storage pump with hydraulic fluid with a certain maximum pressure. The delivery rate of the third displacement machine 50 thereby can be increased considerably. In particular, the same can be operated with higher rotational speeds than would be possible without a feed pump.

In FIGS. 3 and 4, the third hydraulic displacement machine 50 is used to recover energy from an apparatus 4 or to support the drive thereof. There is provided a first hydraulic circuit comprising the hydraulic pump 1 and the hydraulic motor 2, by means of which the apparatus 4, in this case a hoisting winch of a crane, can be driven. As already shown in the first embodiment, the hydraulic pump 1 is driven by an internal combustion engine. The third hydraulic displacement machine is connected with the drive shaft of the apparatus 4, so that e.g. when lowering the load, the third hydraulic displacement machine 50 operates as hydraulic pump which is driven by the apparatus 4 and delivers hydraulic fluid into the high-pressure accumulator 60. On the other hand, when lifting the load, the hydraulic motor 2 can be supported by the third hydraulic displacement machine 50 which operates as hydraulic motor and is driven by the hydraulic fluid in the high-pressure accumulator 60. In the two embodiments, a valve 70 furthermore is provided, via which the high-pressure accumulator 60 can be connected with the hydraulic pump 1, so as to be able to charge the hydraulic accumulator.

In accordance with the invention, the third displacement machine 50 is supplied with hydraulic fluid by the feed pump 21 or 22. Feed systems 11, 12 each are provided in accordance with the invention, in which the feed pump 21, 22 is driven by a hydraulic drive motor 31, 32. Since the feed pump 21, 22 should supply the third hydraulic displacement machine 50 with large volumes of hydraulic fluid with a corresponding supply pressure, the ratio between the absorption volumes of the hydraulic drive motors 31, 32 and that of the feed pumps 21, 22 is adapted correspondingly. A typical ratio for example would be 1:50, so that with a delivery pressure of the feed pump 21, 22 of about 5 bar an operating pressure of about 250 bar is obtained for the hydraulic drive motors 31 and 32. The hydraulic drive motors and hydraulic feed pumps each again are configured as fixed displacement pumps. The hydraulic drive motors and the hydraulic feed pumps each are connected with each other without interposed mechanical transmission.

In both embodiments, a further feed pump 20 is provided in accordance with the present invention, in order to supply the first hydraulic circuit with hydraulic fluid. The feed system 10 of the invention exactly is constructed as shown already in FIG. 1 with respect to the first embodiment. In particular, a hydraulic drive motor 30 is provided for driving the feed pump 20, wherein the hydraulic drive motor 30 in turn is driven via a second hydraulic pump 40. The second hydraulic pump 40 in turn is driven by the internal combustion engine 3.

The drive of the feed pumps 21 and 22 for supplying the third hydraulic displacement machine 50 on the other hand is solved differently in the embodiments shown in FIGS. 3 and 4.

In the third embodiment shown in FIG. 3, the hydraulic drive motor 31 for driving the feed pump 21 is driven by a separate second hydraulic pump 41, which merely serves to drive the hydraulic drive motor 31. This hydraulic pump 41 in turn is configured as a variable displacement pump with pressure control. The hydraulic pump 41 likewise is driven by the internal combustion engine 3, for which purpose the transfer gear 7 is equipped correspondingly. The drive of the feed system for the third hydraulic displacement machine thus substantially is constructed as described already for the feed systems in the first and second embodiments. In particular, the second hydraulic pump 41 has a smaller maximum absorption volume than the feed pump 21, so that installation space correspondingly can be saved at the transfer gear and the tugging power can be reduced.

FIG. 4 now shows an alternative to the drive version shown in FIG. 3 for the feed pump of the third hydraulic displacement machine 50. The input of the hydraulic drive motor 32 is directly connected with the high-pressure accumulator 60 and the accumulator-side output of the third hydraulic displacement machine 50. The output of the feed pump 22 on the other hand is connected with the input of the third hydraulic displacement machine, which forms the suction side in operation of the accumulator. The pressure ratio on the suction side and on the accumulator side of the third hydraulic displacement machine 50 is adjusted by the absorption volume ratio between the hydraulic drive motor 32 and the feed pump 22. When the third hydraulic displacement machine 50 is in the rest position, the drive motor 32 and the feed pump 22 also are in the rest position in a static equilibrium, so that no tugging power and no energy losses either will occur. In pumping operation of the third hydraulic displacement machine 50, part of the hydraulic fluid delivered into the hydraulic accumulator 60 with high pressure now is used to drive the hydraulic drive motor 32 and hence the feed pump 22.

In both embodiments it is provided that when the third hydraulic displacement machine 50 operates in motor operation, the hydraulic fluid can flow off via a pressure relief valve 51.

The present invention provides a feed system by means of which the hydraulic system can be designed more flexible. In particular, the tugging power can be reduced or installation space can be saved at the transfer gear.

The invention claimed is:
1. A hydraulic system, comprising:
a hydraulic circuit including a first hydraulic pump for providing hydraulic fluid to the hydraulic circuit;
a drive unit connected to the first hydraulic pump for driving the first hydraulic pump;
a feed pump connected to a suction side of the first hydraulic pump for feeding hydraulic fluid into the hydraulic circuit;
a hydraulic drive motor for driving the feed pump; and
a second hydraulic pump for driving the hydraulic drive motor, the second hydraulic pump connected to the drive unit for driving the second hydraulic pump, wherein the hydraulic drive motor is selectively operated with a greater pressure and a correspondingly smaller delivery rate than the feed pump, and a pressure ratio is at least 3:1.

2. The hydraulic system according to claim 1, wherein the feed pump is configured as a fixed displacement pump.

3. The hydraulic system according to claim 1, wherein the second hydraulic pump selectively drives the hydraulic drive motor, and second hydraulic pump is a variable displacement pump.

4. The hydraulic system according to claim 3, wherein the drive unit is driven by an internal combustion engine or an electric motor.

5. The hydraulic system according to claim 1, wherein the feed pump feeds hydraulic fluid with a pressure between 0.1 and 50 bar.

6. A hydraulic system comprising:
a hydraulic circuit including a first hydraulic pump for providing hydraulic fluid to the hydraulic circuit;
a drive unit connected to the first hydraulic pump for driving the first hydraulic pump;
a feed pump connected to a suction side of the first hydraulic pump for feeding hydraulic fluid into the hydraulic circuit;
a hydraulic drive motor for driving the feed pump; and
a second hydraulic pump for driving the hydraulic drive motor, the second hydraulic pump connected to the drive unit for driving the second hydraulic pump,
wherein the feed pump via one or more check valves feeds hydraulic fluid into at least one additional hydraulic circuit.

7. A method for providing hydraulic fluid into a hydraulic system having a hydraulic circuit, comprising:
providing hydraulic fluid to the hydraulic circuit via a first hydraulic pump;
driving the first hydraulic pump via a drive unit connected to the first hydraulic pump;
providing hydraulic fluid into the hydraulic circuit via a feed pump connected to a suction side of the first hydraulic pump;
driving the feed pump via a hydraulic drive motor;
driving the hydraulic drive motor via a second hydraulic pump; and
driving the second hydraulic pump via the drive unit,
wherein the hydraulic drive motor is selectively operated with a greater pressure and a correspondingly smaller delivery rate than the feed pump, and the pressure ratio is at least 3:1.

8. The method according to claim 7, wherein the feed pump feeds hydraulic fluid with a pressure between 0.1 and 50 bar.

9. The method according to claim 7, wherein the feed pump is a fixed displacement pump.

10. The method according to claim 9, wherein the second hydraulic pump selectively drives the hydraulic drive motor, and the second hydraulic pump is a variable displacement pump.

* * * * *